Dec. 30, 1958 M. MAMON 2,866,942
APPARATUS FOR DIRECT CURRENT CONSTANT VOLTAGE POWER SUPPLY
Filed March 30, 1954

INVENTOR:
Michel Mamon
BY
Karl F. Ross
Agent

United States Patent Office 2,866,942
Patented Dec. 30, 1958

2,866,942

APPARATUS FOR DIRECT CURRENT CONSTANT VOLTAGE POWER SUPPLY

Michel Mamon, New York, N. Y., assignor of forty percent to George A. Rubissow, New York, N. Y., and sixty percent to Magnetic Controls Inc., New York, N. Y., a corporation of New York Application March 30, 1954, Serial No. 419,677

3 Claims. (Cl. 321—16)

This is a continuation in part of application for Letters Patent, Serial No. 378980, filed September 8, 1953.

This invention relates to a new device of the group of static voltage regulators, which provide a constant D. C. voltage when the applied A. C. voltage varies within a certain range.

Figure 1:
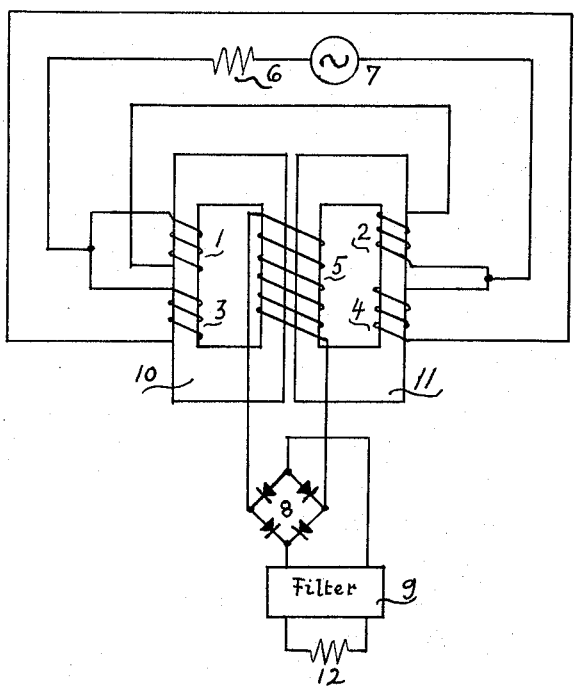
Figure 2:
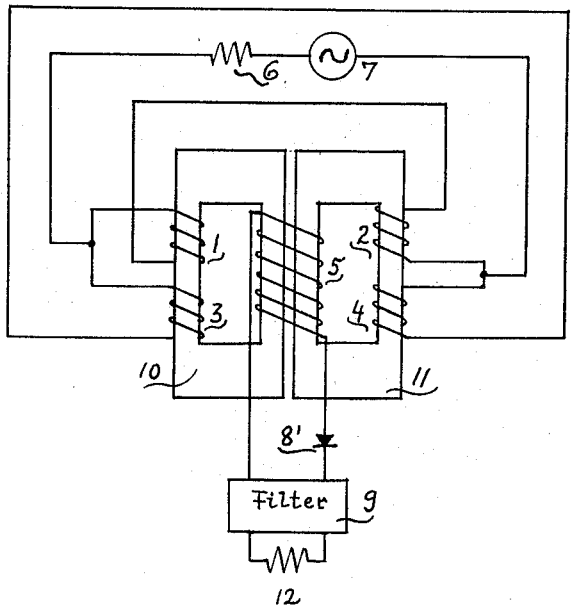

This invention will be more fully understood and apprehended by the illustration of a typical system and apparatus used as herein described and illustrated in the appended Figures 1 and 2.

In herein illustrated figures the examples given do not limit the invention thereto and the like references refer to like meanings.

Fig. 1 shows an embodiment of my voltage regulator having a full-wave rectifier bridge in the output circuit and Fig. 2 shows another embodiment with a half-wave rectifier in its output.

One aspect of this invention, shown on Figure 1, comprises a circuit having two identical ferromagnetic cores 10 and 11, preferably "sideways-air-gap" with U-type laminations, or better, toroidal gapless cores of high permeability. Each of said cores is wound at least with three windings: Two sets of primary windings connected in parallel, each set having two coils, preferably equally rated: Coils 1, 2, and 3, 4, wound on the outer legs. Coils 1, 2 are connected in series aiding and Coils 3, 4 are connected in series opposing. The primary windings are connected to an A. C. source 7, preferably in series with a current limiting resistor 6. The output winding 5 is wound around the center leg, and its terminals are connected to a full wave bridge rectifier 8, the D. C. terminals of which are connected to a load 12 through an optional filter 9.

Another aspect of this invention is shown on Figure 2. Here, instead of a full wave bridge, only a half wave rectifier 8 is used. It should be understood that the scope of the present invention is not limited by the use of a half wave or full wave bridge in the output circuit as shown on Figures 1 and 2. The present invention gives good performance when the output winding 5 is connected to a voltage doubler half wave, voltage doubler full wave, voltage tripler, voltage quadrupler, or to any other combination of half wave rectifiers or capacitors.

The current limiting resistor 6 limits the primary current flowing in primary windings 1, 2 and 3, 4. With this invention it is possible to omit this current limiting resistor 6 but then heavier wire size is necessary for primary windings, thus useful window area will be sacrificed.

With only one set of primary windings present 1, 2 or 3, 4 the regulation of the output current in the load 12 with varying A. C. voltage 7 is somewhat poorer than when both sets of primary windings are used. By using different types of core material, I found that cores which exhibit a bended hysteresis loop used in connection with this invention provide high accuracy regulation of the output current. When the line voltage varies as much as ±20%, the regulated output is better than .2%. But if the supply frequency varies, this type of core material gives somewhat poorer regulation when used in the circuit of my invention shown on Figures 1 and 2. When core material of rectangular hysteresis loops is used in the circuits of Figures 1 and 2, then supply voltage frequency variation does not affect the output current in the load 12 of Figures 1 and 2. This is in accordance with the views on rectangular hysteresis loop core material expressed by D. G. Scorgie and C. W. Lufcy of the U. S. Naval Ordnance Laboratory.

In accordance with the provisions of the U. S. Patent Office regulations, I have described the principle of my invention, together with the apparatus which I now consider to represent the best embodiment thereof. However, it should be understood that the apparatus and their embodiments described is illustrative only and that the invention is not limited thereto. Other core configurations are possible, such as three-legged, four-legged cores, etc.

What I claim to be new and desire to secure by Letters Patent of the United States is:

1. In a power circuit, in combination, a source of alternating current, a first and a second ferromagnetic core, a first pair of input windings on said first core connected in aiding relationship across said source, a second pair of input windings on said second core connected in opposed relationship across said source, and an output circuit comprising conductor means linking said first core and said second core in a plurality of serially interconnected turns.

2. The combination according to claim 1, further comprising rectifier means in said output circuit in series with said output windings.

3. The combination according to claim 1, further comprising current-limiting resistor means in series with said source and with all of said input windings.

References Cited in the file of this patent

UNITED STATES PATENTS

| | | |
|---|---|---|
| 2,561,329 | Ahlen | July 24, 1951 |
| 2,693,567 | Yeager | Nov. 2, 1954 |